United States Patent [19]
Hansen et al.

[11] 3,955,676
[45] May 11, 1976

[54] ADJUSTABLE SHIPPING RACK AND MEANS FOR SECURING FLAT SHEETS THERETO

[75] Inventors: Ralph C. Hansen, Toledo, Ohio; Rae E. Vande Water, Jackson; Owen W. Sherwin, Spring Harbor, both of Mich.

[73] Assignee: Libbey-Owens-Ford Company, Toledo, Ohio

[22] Filed: Sept. 20, 1974

[21] Appl. No.: 507,891

Related U.S. Application Data

[62] Division of Ser. No. 384,620, Aug. 1, 1973, Pat. No. 3,878,942.

[52] U.S. Cl. ............................ 206/451; 105/471; 206/454; 211/49 R; 214/10.5 R
[51] Int. Cl.² .......................................... B65D 85/48
[58] Field of Search ................. 105/367, 469, 471; 206/449, 451, 454; 211/49 R, 50; 214/10.5 R; 248/361 R; 280/179 R

[56] References Cited
UNITED STATES PATENTS

| | | | |
|---|---|---|---|
| 2,940,402 | 6/1960 | Hansen et al. | 105/367 |
| 3,173,645 | 3/1965 | Gray | 105/471 |
| 3,596,755 | 8/1971 | Bundy et al. | 214/10.5 R X |
| 3,809,234 | 5/1974 | Kurick | 206/451 X |

Primary Examiner—Steven E. Lipman
Attorney, Agent, or Firm—Collins, Oberlin & Darr

[57] ABSTRACT

A shipping rack for transporting groups of flat sheets of frangible material, such as glass, on their edges and having at least two longitudinally movable A-frame sections interconnected by two adjustable diagonally disposed cross braces or struts wherein each A-frame section has an elongated transverse horizontal base which has a pair of inwardly and downwardly inclined surfaces extending from the ends thereof and a narrow upright triangular framework mounted at the center of the base which provides a pair of oppositely facing inclined L-shaped supporting surfaces for supporting the groups of sheets on their edges. The opposing faces of the A-frame sections are each provided with a pair of offset, vertically spaced pivot pin connections for attachment of the ends of the cross struts. The A-frame section at each end of the rack is provided with a selectively positionable restrainer or outrigger which contacts the ends of its respective group of glass sheets to prevent endwise movement of the sheets relative to the rack. The outriggers are secured in a raised position by flexible straps disposed between the free end of the outrigger and the base of its opposed A-frame section. Also means are provided to secure the groups of flat sheets to the inclined supporting surfaces of the A-frame sections.

6 Claims, 13 Drawing Figures

ADJUSTABLE SHIPPING RACK AND MEANS FOR SECURING FLAT SHEETS THERETO

This is a division of application Ser. No. 384,620, filed Aug. 1, 1973, now U.S. Pat. No. 3,878,942, issued on April 22, 1975.

BACKGROUND OF THE INVENTION

1. Field of the Invention

The present invention relates generally to shipping apparatus for supporting quantities of sheets or plates of glass in groups and, more particularly, to an adjustable rack which can accommodate glass sheets of varying numbers and sizes.

2. Description of the Prior Art

Shipping racks for supporting flat glass sheets on A-frame sections are generally known. For example, see U.S. Pat. No. 3,596,755, issued Aug. 3, 1971. This patent discloses a shipping framework wherein two pairs of A-frames are arranged in each end of the framework with the A-frames of each pair opposite one another. An adjustable wedge-shaped locking device is disposed between each pair of A-frames to secure groups of sheets or plates of glass therebetween. Because of the number of parts and "hardware" required by such a framework, it has the disadvantage of materially increasing the weight thereof and thereby decreasing the pay load a vehicle can carry. Another problem with such a framework is the potential loss of component parts when the framework is dismantled for return shipment.

SUMMARY OF THE INVENTION

Generally the shipping rack of this invention contemplates supporting two groups of outwardly facing flat sheets or plates such as glass on their edges at a small angle to a vertical plane at the center of the rack. Vertical support is provided for the edges of the groups of glass sheets by wedge shaped members affixed to the top of elongated bases so that the inclined surfaces thereof slope inwardly from the ends of the bases. Lateral support is provided for the inner faces of the two groups of glass sheets by at least two narrow A-shaped triangular frameworks, the feet of which are rigidly affixed to the central portion of the elongated base members.

Each A-frame section is interconnected to its adjacent A-frame section by a pair of diagonally disposed telescoping cross braces or struts. These struts have one of their ends pivotally connected to one of the base members while their other end is pivotally connected to the next adjacent A-frame section near its apex. To retain the A-frame sections in a longitudinally spaced relationship, at least two opposite walls of the telescoping members which make up a strut are provided with a plurality of centrally arranged longitudinally spaced apertures. A locking pin is inserted through a set of registering apertures to selectively lock the struts and, thus, the A-frame sections in a vertical position as well as a desired spaced relationship. When the rack is not in use, the sections may be moved towards each other with the struts telescoping together to form a compact unit without disassembling the rack. In order to prevent the A-frame section from becoming separated, the members of the struts are connected together by means of cables or ties which are shorter in length than the extended length of the members comprising the struts.

The A-frame section at each end of the rack is provided with a movable restraining outrigger which is positionable against the end edges of the groups of glass sheets to prevent endwise movement thereof relative to the rack. Such an outrigger may include a restraining beam pivotally mounted on the ends of links vertically pivotable about the base of its A-frame. Straps connected between the restraining beam and the base of the adjacent A-frame section secures this beam in various selectable positions.

Also, means such as flexible banding straps and/or combinations of flexible banding straps and rigid pressure applying members are employed to secure the groups of flat sheets to the shipping rack.

OBJECTS AND ADVANTAGES

Thus, an object of this invention is to provide a unitized adjustable shipping rack wherein a pair of spaced A-frame sections are always interconnected to each other but which can be set up to accommodate sheets of varying sizes and can be reduced to a compact unit for return shipment.

Another object is to provide a shipping rack which requires only one triangular framework per section.

Yet another object is to provide each outer A-frame section with selectively positionable restraining outriggers to prevent endwise movement of the glass sheets.

A still further object is to provide an adjustable shipping rack which is simply constructed, efficient in operation, and inexpensive to manufacture.

Other objects and advantages of the invention will become apparent during the course of the following description when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENTS

Figure 1:
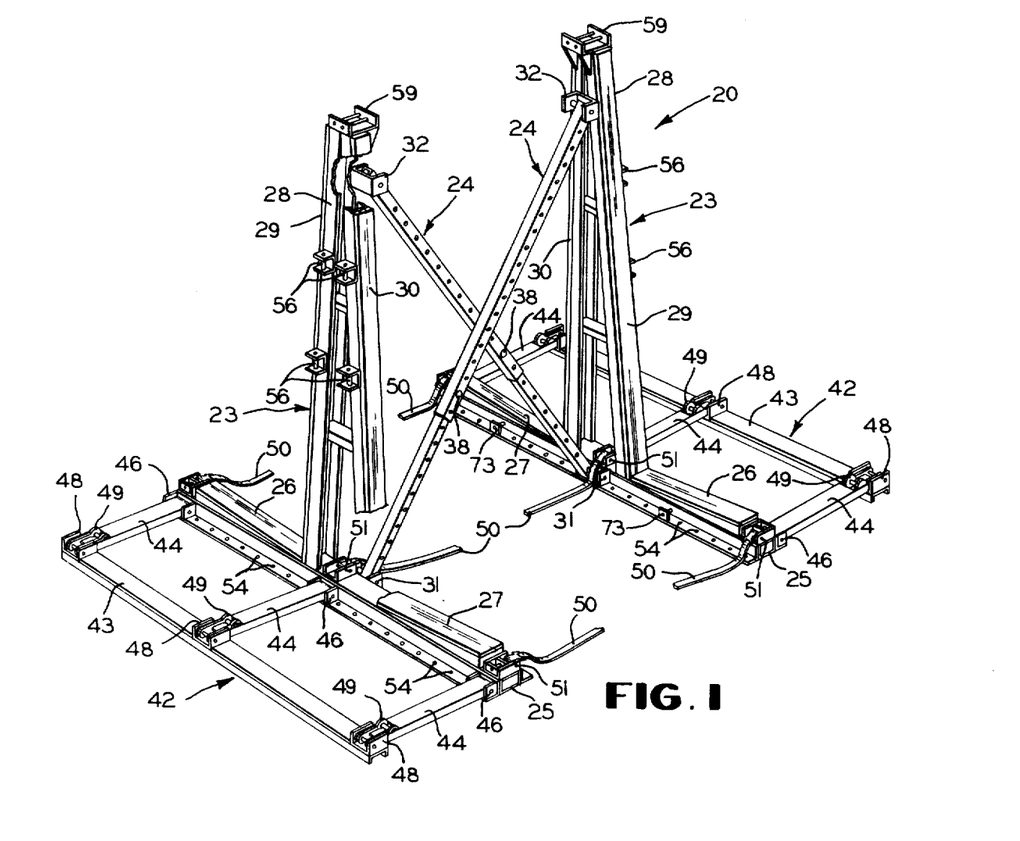
FIG. 1 is a perspective view showing an adjustable shipping rack constructed in accordance with this invention with parts thereof broken away for clarity.

Referring now to FIG. 1, an adjustable shipping rack 20 for transporting groups or packages of glass sheets 21 and 22 (see FIG. 6) on their edges in an inclined position according to this invention generally comprises a pair of like longitudinally spaced A-frame sections 23 interconnected by a pair of like adjustable diagonally disposed cross struts 24. Since these A-frame sections 23 are mirror images of each other, the same reference numerals are applied to the corresponding parts thereof.

The A-frame sections 23 are preferably made of structural aluminum channels and angles so as to minimize their weight and thereby increase the pay load a vehicle can carry as well as reduce its return shipping costs. An A-frame section 23 includes a transversely disposed elongated base member 25. Mounted on the top adjacent the ends of the base 25 are wedge members 26 and 27 whose inclined faces extend inwardly and downwardly toward the center of the base member 25. Thus, the inclined faces of the wedge members 26 and 27 support the bottom edges of the groups of glass sheets 21 and 22 at an acute angle to the horizontal. Fixedly mounted to the base 25 centrally of the inner ends of the wedges 26 and 27 and extending vertically from the base 25, is a narrow triangular framework 28 having converging side faces 29 and 30. These faces 29 and 30 provide inclined lateral supports against which the substantially vertical surfaces of the inner sheets of the group of glass sheets rests when they are standing on their bottom edges on the inclined faces of the wedges 26 and 27. The inclined faces 29 and 30 of the framework 28 are normal, that is, at right angles to the inclined faces of the wedges 26 and 27 and in combination provide L-shaped supporting surfaces. Therefore, the sheets of glass within the groups 21 and 22 will be parallel and their edges will be aligned. The supporting surfaces of the wedges and triangular framework are provided with appropriate cushioning material such as felt and/or hard rubber to protect the inner faces and edges of the glass groups 21 and 22 which rest there-against from damage.

Although various arrangements of the cross braces or struts 24 may be used to interconnect adjacent A-frame sections 23, they are preferably diagonally disposed and pivotally connected at one end to the base 25 of one A-frame secton 23 and at the other end near the apex on the triangular framework 28 of the next adjacent A-frame section 23 to form a rigid structure and support the A-frame sections 23 in their upright position.

Figure 2:
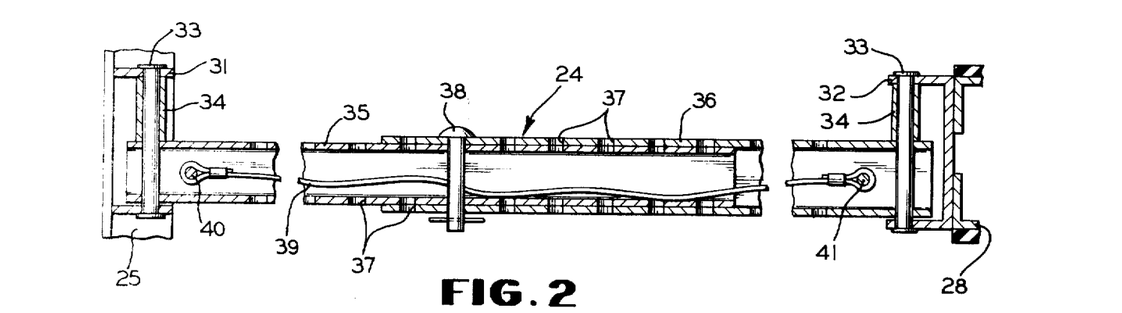
FIG. 2 is a cross sectional view of one of the telescoping cross braces or struts showing means for preventing separation of the tubular members and its pivot connections.
Figure 3:
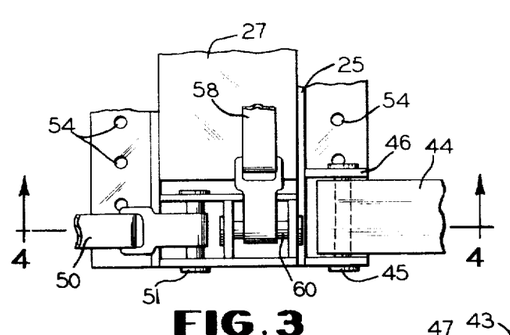
FIG. 3 is an enlarged fragmentary top plan view of an outer end of the base showing the pivotal connection of the outrigger links.
Figure 4:
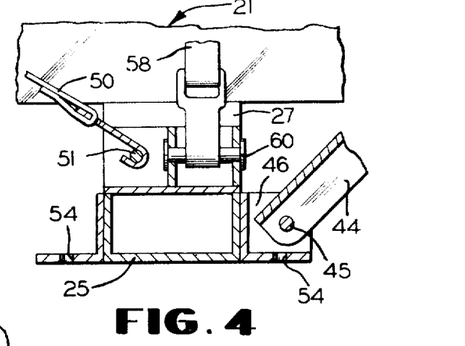
FIG. 4 is an enlarged cross sectional view taken along line 4—4 in FIG. 3 showing the anchor pins for the banding straps.
Figure 5:
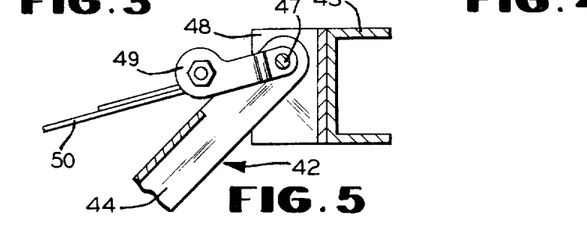
FIG. 5 is an enlarged fragmentary cross sectional view showing the pivotal connection between the beam, link, and belt fastener.

As best show in FIG. 1, one side of the A-frame section 28 is provided with a pair of aligned vertically spaced elongated U-shaped brackets 31 and 32. The bracket 31 may be welded or otherwise suitably secured to the central portion of the base 25 and the bracket 32 is likewise secured to the triangular framework 28 near its apex. Thus, as shown in FIG. 2, one end of a strut 24 is disposed between and pivotally connected to the legs of the U-bracket 31 affixed to the base 25 by a pivot pin 33 and a spacer 34 while its other end is pivotally connected in a similar manner to the U-bracket 32 affixed to the triangular framework 28 of the next adjacent A-frame 23. Another strut 24 is similarly connected but in reverse order between these two adjacent A-frame sections 23 (see FIG. 1).

Referring now to FIG. 2, a strut 24 is preferably constructed from two square elongated tubular members 35 and 36 of different size so that one member 35 can be telescopically received within the other member 36. In order to retain thse telescoping members 35 and 36 at a desired extension, at least two opposite walls of each member are provided with a plurality of aligned longitudinally spaced apertures 37 wherein the apertures 37 in each member can be brought into registry with each other. Once the desired spacing between adjacent A-frame sections 23 is set, a bolt or lock pin 38 is placed through a set of registering apertures 37 to lock the A-frame sections 23 in the selected spaced relationship.

In order to prevent the interconnected A-frame sections 23 from being separated from each other, the strut 24 is provided with means to prevent its telescoping tubular members 35 and 36 from becoming disassembled when the pin 38 is removed. Thus, as shown in FIG. 2, a flexible cable 39 having looped ends and whose over-all length is somewhat shorter than the extended length of the tubular members 35 and 36, is disposed within and secured to the outer ends of the tubular members. To tie these two members together in this case, one end of the cable 39 is held by a pin 40 welded adjacent the outer end of the tubular member 35 and the other looped end of the cable 39 is held by a pin 41 fixed adjacent to the outer end of the tubular member 36 in a similar manner.

To prevent endwise or longitudinal shifting of the groups of glass sheets 21 and 22 relative to the rack 20, the end A-frame sections 23 are provided with a selectively positionable restrainer or outrigger means 42 which is pivotally mounted on the outwardly facing sides of the base members 25. This restrainer or outrigger 42 generally comprises a restraining beam 43 which, as here shown, is pivotally connected to the ends of a plurality of links 44 whose other ends are pivotally connected to the elongated base member 25. As best shown in FIGS. 1, 3, 4, and 5, one end of each of the links 44 is pivotally connected by pivot pins 45 journalled in apertures provided in a like plurality of U-shaped brackets 46 which are secured to and spaced along the outer side of the base member 25. The other ends of each of the links 44 are pivotally connected to pivot pins 47 journalled in eccentrically placed apertures provided in a like plurality of U-shaped brackets 48 which are secured to and spaced along the inner face of the restraining beam 43. Since the restraining beams 43 are eccentrically held at their upper edge, they will depend in a vertical plane to present a flat surface when they bear against the edges of the glass groups 21 and 22. The inner face of the restraining beam 43 is also provided with an appropriate cushioning material (not shown).

Also journalled on each of the connecting pivot pins 47 is a ratcheted type belt fastener 49 (see FIG. 5) which cooperates with belts 50 whose one end is secured to anchor pins 51 secured to and spaced along the upper surface of the base member 25 in alignment with the U-brackets 46. The free ends of the belts 50 are threaded through ratcheted fasteners 49 in a conventional manner and selectively tensioned to move and urge the restraining beam 43 against the end edges of the groups of sheet material placed thereon thus preventing movement of these groups relative to the rack.

Figure 8:
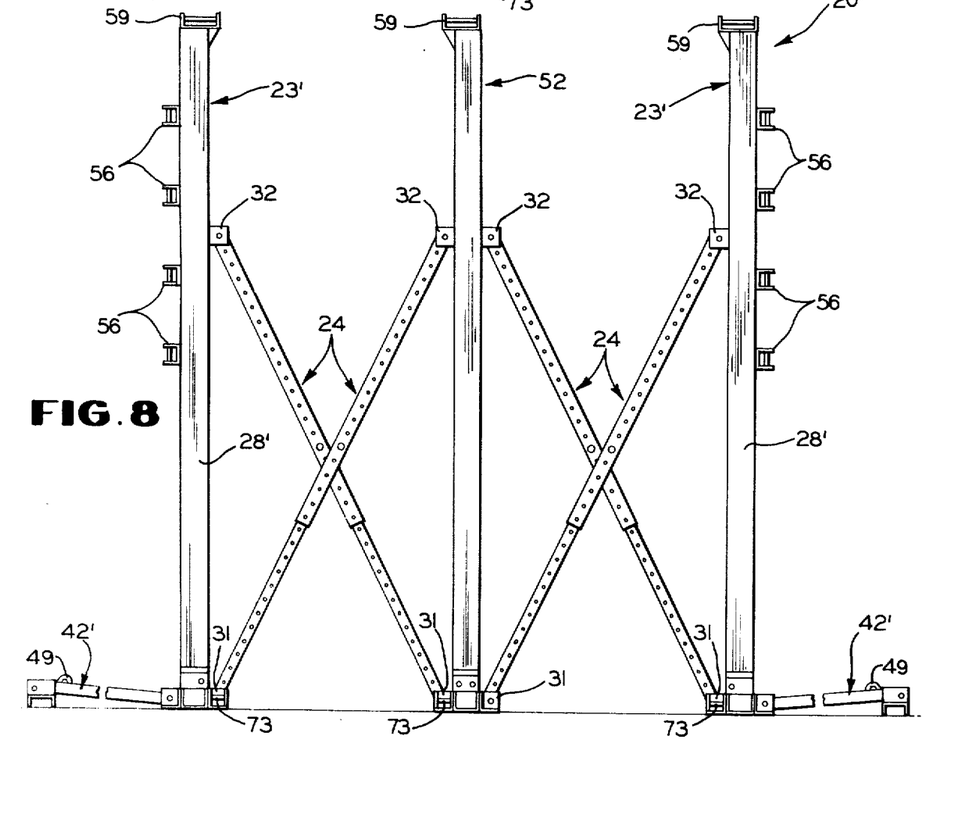
FIG. 8 is an elevational view showing a modification of a rack which is provided with a central A-frame section.

When larger sizes of glass sheets than can be accommodated on a rack 20 having only two A-frame sections 23 are to be transported, a rack 20' having three A-frame sections such as shown in FIG. 8 is provided. According to this invention, the rack 20' comprises a pair of larger sized end A-frame sections 23' which are connected to a central or intermediate A-frame section 52 by pairs of struts 24. In this case, both faces of the A-frame 52 are provided with brackets 31 and 32 to connect ends of the struts 24 thereto as previously described for the rack 20. Also, the end A-frames 23' are provided with larger sized restrainers 42' to prevent endwise movement of the sheets placed on this rack 20'. Otherwise, the structure and operation of this rack 20' is the same as described for the rack 20.

Figure 6:
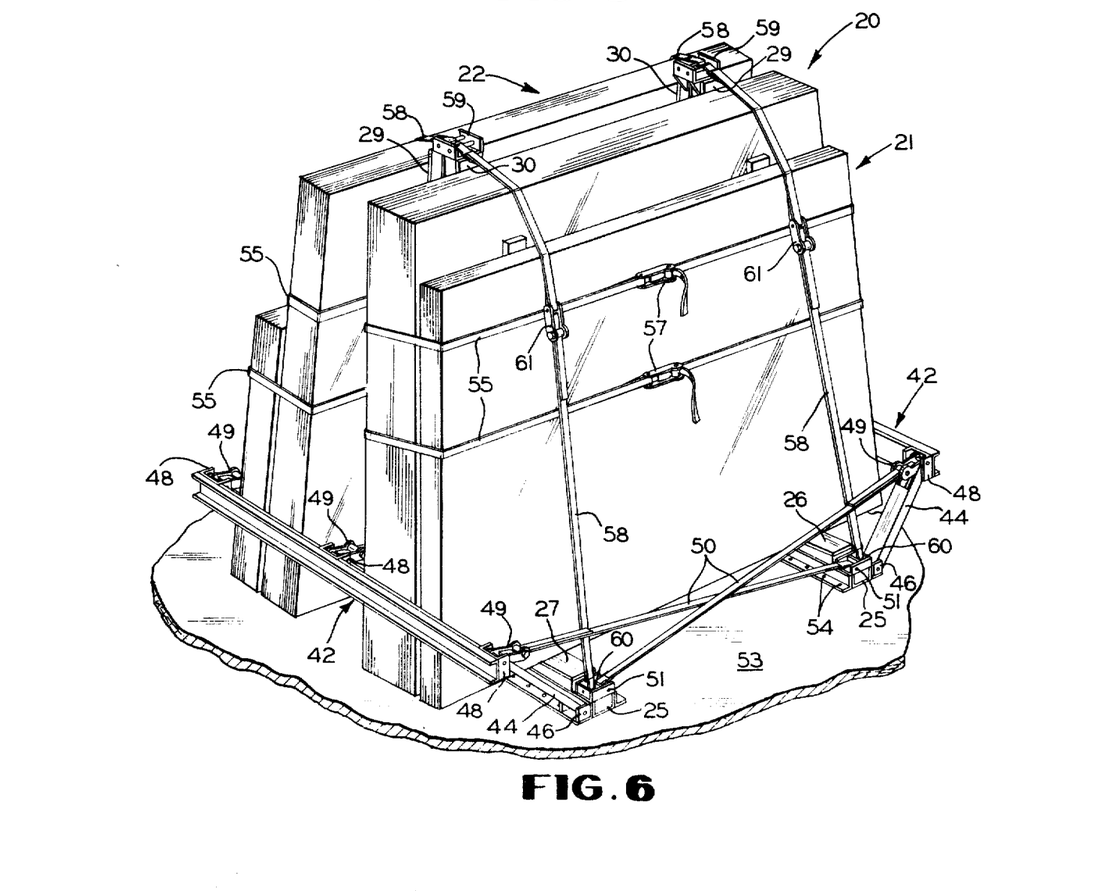
FIG. 6 is a perspective view of a loaded rack showing its banding arrangement for holding groups of glass sheets thereto.
Figures 9, 10, 11:
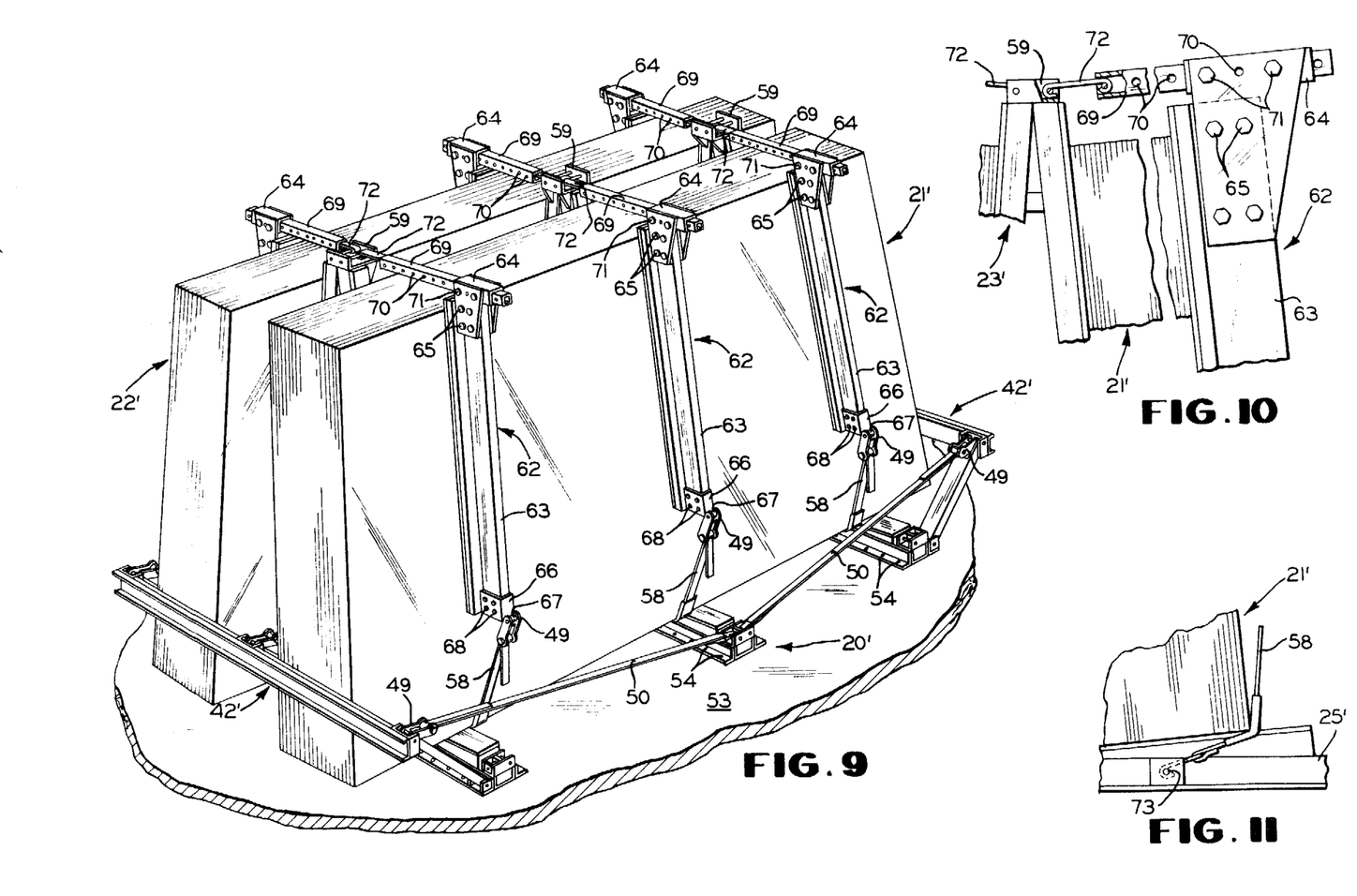
FIG. 9 is a perspective view of an embodiment of tiedown devices for holding groups of glass sheets to a shipping rack in accordance with this invention.
FIG. 10 is an enlarged fragmentary view of the telescoping end of the tie-down devices shown in FIG. 9.
FIG. 11 is an enlarged fragmentary view of the A-frame base showing the location of an anchor means used in conjunction with the tie-down devices shown in FIG. 9.
Figure 12:
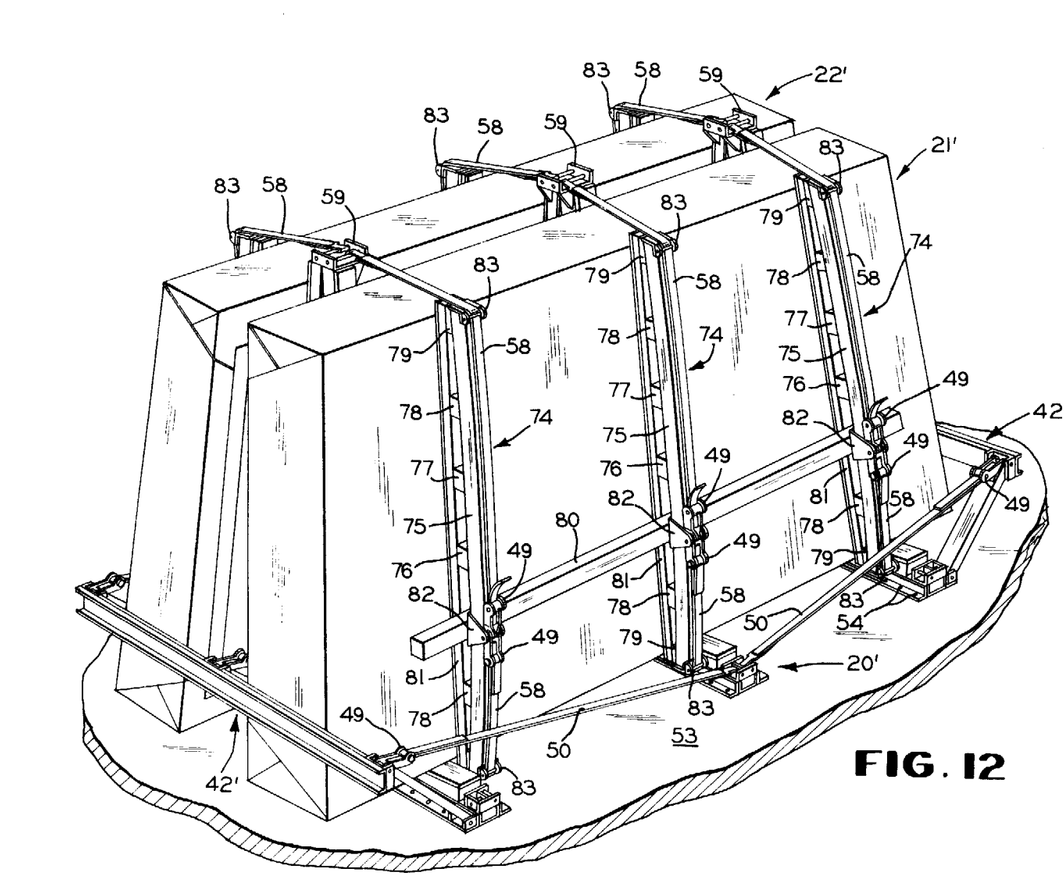
FIG. 12 is a perspective view of another embodiment of tie-down devices for holding groups of glass sheets to a shipping rack.

When either a shipping rack 20 or 20' is to be used to transport groups of glass sheets, it is first placed on a flat bed or floor 53 of a vehicle (not shown) as indicated in FIGS. 6, 9, or 12, and the desired spacing between the A-frame sections of the rack 20 or 20' is set as previously described. The bases of the A-frames are then secured to the floor 53 of a truck trailer or railway car such as by double-headed nails driven through apertures 54 provided in the bases 25 of the A-frame. Glass sheets which are divided into two approximately equal groups 21 and 22 or 21' and 22', are placed on the rack 20 or 20', respectively, with one of the groups resting against the left-hand inclined L-shaped supporting surfaces and the other group resting against the right-hand inclined L-shaped supporting surfaces on the A-frames of the racks 20 or 20'. After the groups 21 and 22 or 21' and 22' of glass sheets have been placed on the rack 20 or 20' as shown in FIGS. 6, 9, or 12, each group is covered with a sheet of protective material and individually secured thereto.

In one embodiment, the groups of glass sheets are secured to either of the racks 20 or 20' by horizontally and vertically disposed banding straps. Thus, as shown in FIG. 6, the groups 21 and 22 are secured to the lateral supporting surfaces of the A-frame sections 23 by horizontally disposed banding straps 55 whose free ends are secured to anchors 56 affixed to the outer faces of the A-frame sections 23. These straps extend around the groups of flat sheets and are tensioned and buckled as at 57 to urge the groups 21 and 22 against the converging sides 29 and 30 of the triangular framework 28. Vertically disposed banding straps 58 which are connected at one of their ends to anchors 59 (see FIGS. 3 and 4) affixed to the apex of the triangular framework 28 and at their other ends to anchors 60 affixed to the base members 25 are placed under tension and secured as by buckles 61 to urge the groups of glass 21 and 22 against the horizontally disposed wedge members 26 and 27 to secure the groups 21 and 22 to the rack 20. The restrainers or outriggers 42 are then moved upwardly into position and tightened against the end edges of the glass groups 21 and 22 by the belts 50 and fasteners 49 as previously described. The groups 21' and 22' may be secured to the rack 20' in a like manner.

If more support is desired or required to secure the groups of glass sheets to either the rack 20 or 20', a plurality of tie-down devices 62 comprising an L-shaped pressure applying member and flexible tie means may be provided as shown in FIG. 9 for the rack 20'. Referring now to FIG. 10, these devices 62 generally include a substantially vertically elongated brace member 63 whose upper end is provided with a tubular portion 64 having its longitudinal axis arranged at a right angle to the elongated brace member 63. This tubular portion 64 is secured to the upper end of the vertically disposed brace member 63 as by bolts 65. The other or bottom end of the brace member 63 is provided with a bracket 66 having an apertured post 67. This bracket 66 is secured to the brace member 63 by bolts 68 (see FIG. 9). The inner face of this member 63 is provided with suitable cushioning material which lies against the outer face of the glass groups.

An elongated tubular member 69 is telescopically received within the tubular portion 64 and in order to retain the member 69 at a desired extension relative thereto, at least two opposite side walls of the potion 64 and the member 69 are provided with a plurality of axially spaced apertures 70 which register with each other. Locking pins or bolts 71 placed through sets of registering apertures 70 lock the member 69 at the desired extension. The inner end of the telescoping member 69 is provided with a hook means 72 for attachment thereof to the anchor 59 of the A-frame 23'.

Accordingly, the groups of glass sheets 21' and 22' are held on the rack 20' by hooking the members 69 to the anchors 59 on the A-frames 23', positioning the vertically disposed brace members 63 so that their cushioned faces bear against the outer face of the glass groups and locking these members 63 and 69 together as previously described. The bottom ends of the braces 63 are secured to the rack 20' by anchoring one end of a belt 58 to an anchor 73 affixed to and intermediate the ends of the base 25' as shown in FIG. 11. The free ends of the belts 58 are secured to ratcheted belt fasteners 49 pivotally mounted on the apertured posts 67 secured to the braces 63 and placed under tension to apply pressure against the glass groups. The outriggers 42' are then positioned against the ends of the glass groups 21' and 22' by belts 50 and fasteners 49. The groups of glass sheets 21 and 22 may be secured to the rack 20 in a like manner.

In order to apply a constant pressure against the faces of the glass groups placed on either the racks 20 or 20', a plurality of tie-down devices 74 may be employed as shown for the rack 20' in FIG. 12. Such tie-down devices 74 generally comprise substantially elongated axially deflectable tubular brace members or columns 75 supported on a plurality of axially spaced blocks 76, 77, 78 and 79 which decrease in height from approximately the center of the columns 75 to their ends. A longitudinally disposed beam 80 having a thickness equal to the height of the blocks 77 extends across the tie-down devices 74 to form an integral unit. These blocks 76 through 79 and the beam 80 bear against cushioned plate members 81. A pair of belt fasteners 49 are pivotally mounted on U-brackets 82 affixed to each column 75 adjacent the longitudinally extending beam 80.

Figure 13:
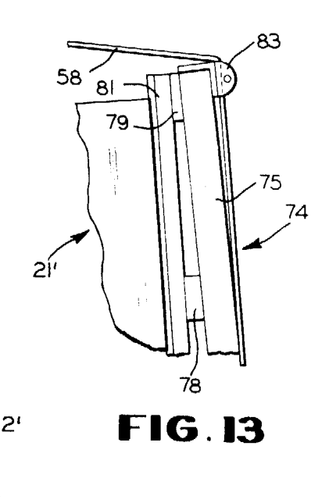
FIG. 13 is an enlarged fragmentary view of the upper end of the tie-down devices shown in FIG. 12.

Accordingly, the groups of glass sheets 21' and 22' are held to the rack 20' by attaching one end of a belt 58 to the anchor 59 at the top of the A-frame sections 23' and the end of a belt 58 to the anchor 73 as shown in FIG. 11. The free ends of these belts 58 are threaded through belt loops or runners 83 affixed to each end of the columns 75 (see FIG. 13) and secured to the belt fasteners 49. The belts 58 are tensioned so as to deflect the columns 75 against the blocks 76 through 79 and the beam 80 so that the cushioned plate members 81 apply the same degree of pressure against the faces of the glass groups 21' and 22'. As in the previous embodiment, the outriggers 42' are positioned against the ends of the groups 21' and 22' by the belts 50 to prevent endwise movement thereof to the rack 20'. Also these tie-down devices 74 may be employed to hold the groups of glass sheets 21 and 22 to the rack 20.

Figure 7:
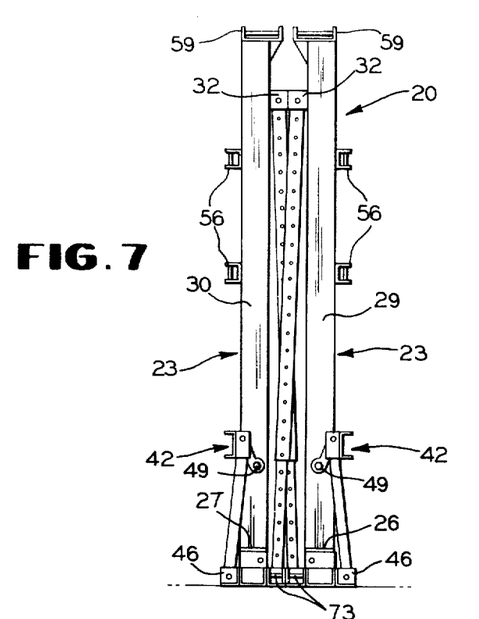
FIG. 7 is an elevational view showing the rack in its closed or collapsed position.

When either a rack 20 or 20' is to be returned empty to its source of origin, it can be collapsed as shown in FIG. 7 by removing the lock pins 38 from the telescoping struts 24 and moving its A-frame sections together. The belts 50 may be used to tie the outriggers 42 to their respective frame sections. Accordingly, a carrier vehicle can carry more racks or be utilized for additional freight thus increasing the carrier vehicle's pay load and decreasing the shipping cost per rack.

In any event, it is to be understood that the forms of the invention herewith shown and described are to be taken as illustrative embodiments only of the same, and that various changes in the shape, size, number and arrangement of the parts may be resorted to without departing from the spirit of the invention as defined in the following claims.

We claim:

1. In a shipping rack for transporting two groups of flat sheets in a spaced, generally vertical position on their longitudinal edges, and having at least a pair of interconnected A-frame sections, each said section including a transverse horizontal base and angularly disposed outwardly facing L-shaped sheet supporting surfaces, the improvement comprising:
   a. at least a pair of vertically spaced anchor means fixedly secured to each said A-frame section wherein one of said anchor means is positioned at the top of said A-frame section and the other of said anchor means is positioned intermediate the ends of said base;
   b. an elongated substantially rigid brace member extending across the outer face of an associated group of sheets and between said pair of anchor means; and
   c. means fastening one end of said brace member to said top anchor means and the other end of said brace member to said base anchor means, said fastening means including additional means urging said brace member against the outer face of the associated group of sheets.

2. In a shipping rack for transporting two groups of flat sheets in a spaced, generally vertical position on their longitudinal edges, and having at least a pair of interconnected A-frame sections, each said section including a transverse, horizontal base and angularly disposed outwardly facing L-shaped sheet supporting surfaces, the improvement comprising:
   a. at least a pair of vertically spaced anchor means fixedly secured to each said A-frame section wherein one of said anchor means is positioned at the top of said A-frame section and the other of said anchor means is positioned intermediate the ends of said base;
   b. a pressure member connected between said pair of anchor means, said pressure member comprising:
      1. an elongated cushion brace member extending across the outer face of the groups of flat sheets;
      2. adjustable means connected between said top anchor means and an end of said brace member to position and retain said brace member against said outer face; and
      3. a banding strap connected between said base anchor means and the other end of said brace member and urging said brace member against said outer face; and
   c. means for urging said pressure member against the outer face of the associated group of sheets.

3. A shipping rack according to claim 2, wherein said brace member includes an apertured tubular portion, said adjustable means comprises an apertured tubular member having a hook at one end connected to said top anchor and telescopically positioned within said tubular portion and removable locking means placed in registering apertures of said tubular portion and said tubular member for securing said portion and said member together in selected positions.

4. In a shipping rack for transporting two groups of flat sheets in a spaced, generally vertical position on their longitudinal edges, and having at least a pair of interconnected A-frame sections, each said section including a transverse, horizontal base and angularly disposed outwardly facing L-shaped sheet supporting surfaces, the improvement comprising:
   a. at least a pair of vertically spaced anchor means fixedly secured to each said A-frame section wherein one of said anchor means is positioned at the top of said A-frame section and the other of said anchor means is positioned intermediate the ends of said base;
   b. a pressure member connected between said pair of anchor means, said pressure member comprising:
      1. an elongated cushioned brace member extending across the outer face of said groups of flat sheets;
      2. a deflectable member extending along said cushioned brace member;
      3. means disposed between said cushioned member and said deflectable member which supports and permits movement of said deflectable member relative to said brace member; and
      4. at least one banding strap connected between said pair of anchor means and extending along said deflectable member for applying pressure thereto to urge said deflectable member against said cushioned member; and
   c. means for urging said pressure member against the outer face of the associated group of sheets.

5. A shipping rack according to claim 4, wherein said deflectable member comprises a tubular column deflectable along its longitudinal axis and said support means comprises a plurality of blocks spaced along said column which decreases in height from the center of said tubular column to each of its ends.

6. A shipping rack accoding to claim 5, wherein a banding strap connected between each end of said tubular column and one of said anchors individually applies pressure at the ends of said column so that said tubular column deflects and applies pressure uniformly to said blocks throughout its length.

* * * * *

UNITED STATES PATENT AND TRADEMARK OFFICE
CERTIFICATE OF CORRECTION

PATENT NO. : 3,955,676
DATED : May 11, 1976
INVENTOR(S) : Ralph C. Hansen et al

It is certified that error appears in the above-identified patent and that said Letters Patent are hereby corrected as shown below:

Col. 4, line 14, "thse" should be --these--
Col. 6, line 52, after "substantially" insert --vertically--

Signed and Sealed this

Third Day of August 1976

[SEAL]

Attest:

RUTH C. MASON
Attesting Officer

C. MARSHALL DANN
Commissioner of Patents and Trademarks